United States Patent

[11] 3,603,145

| | | |
|---|---|---|
| [72] | Inventor | Billy P. Morris<br>Midland, Tex. |
| [21] | Appl. No. | 835,463 |
| [22] | Filed | June 23, 1969 |
| [45] | Patented | Sept. 7, 1971 |
| [73] | Assignee | The Western Company of North America, Inc.<br>Fort Worth, Tex. |

[54] MONITORING FLUIDS IN A BOREHOLE
16 Claims, 6 Drawing Figs.

[52] U.S. Cl.................................................. 73/155,
181/0.5 BE
[51] Int. Cl.............................................. E21b 47/10
[50] Field of Search.................................... 73/189,
152, 155; 340/18, 18 HD, 18 DR, 3 D, 5 S; 181/0.5 BI

[56] References Cited
UNITED STATES PATENTS
2,233,992  3/1941  Wyckoff...................... 73/152 X
3,112,466  11/1963  Engle et al.................... 340/18

*Primary Examiner*—Jerry W. Myracle
*Attorney*—Wofford and Felsman

ABSTRACT: This specification discloses method and apparatus for monitoring flow and character of fluids in a borehole penetrating subterranean formations, characterized by transmitting acoustic energy through the fluids between transducers in a down-hole tool and discriminating intelligence bits from the acoustic energy arriving at the transducer serving as receiver. A portion of the acoustic energy is transmitted upstream and a portion of the acoustic energy is transmitted downstream. In one embodiment, intermittent acoustic energy is employed and the intelligence bits are, respectively, the travel time downstream and the travel time upstream; affording information as to the difference in the respective travel times which is related to velocity of flow of the fluids and the average travel time which is related to the density of the fluids. In another embodiment, intermittent or continuous acoustic energy is employed and the intelligence bits are, respectively, apparent frequency affording information as to frequency shift which is related to velocity of fluid flow and amplitude which is related to fluid density. Also disclosed are specific details of generating functions related to the received acoustic energy; and to the logging of the intelligence information with respect to depth.

PATENTED SEP 7 1971

3,603,145

INVENTOR
Billy P. Morris
BY
Wofford & Felsman
ATTORNEYS

3,603,145

MONITORING FLUIDS IN A BOREHOLE

BACKGROUND OF THE INVENTION

1. Field of the Invention

This invention relates to logging flow velocities and characteristics of fluids in a borehole penetrating subterranean formations. More particularly, it relates to logging flow velocity and characteristics of fluids in a borehole by the use of acoustic energy transmitted through the fluid.

2. Description of the Prior Art

Knowledge of the character of and the flow patterns; e.g., influx or efflux; of fluids in boreholes penetrating subterranean formations has long been significant to the geologist and to the petroleum engineer. For be it may be desirable to recognize leaks in casings in completed wells, to recognize thief formations in injection wells, to recognize the formations taking most of a fluid being injected into an injection well, and to delineate the kind and quantity of fluid a particular stratum or formation is contributing in a production well or, perhaps less frequently, the loss of production fluids to a formation in a production well.

In the past, fluids have been passed through a tool that was set at a depth in a borehole, with means resembling an inverted umbrella to force the fluids to flow therethrough. In the tool, analysis of the character of the fluids is attempted by such complex devices as employing radioactive materials and monitoring gamma ray backscatter; or capacitance probes to monitor the electrical characteristics, such as capacitance, of the fluids. Various venturi meters and inertia meters have been employed to measure flow. The complex structure of the prior art tools have made them undesirable and difficult to move within the borehole. Moreover, the more elaborate tools; such as, those employing radioactive decay with counting of backscatter data; have required complex analysis equipment which was difficult to maintain in working order in a borehole containing fluids. Also, it was difficult to obtain reliable data from the flow devices such as the inertia meters and venturi meters since they were subject to deposition of asphaltenes or solid materials from the formations with subsequent incorrect readings.

DESCRIPTION OF PREFERRED EMBODIMENT(S)

It is a particular feature of this invention to monitor the character and flow of fluids in a borehole penetrating subterranean formations by employing relatively simple, long-tested apparatus transmitting and receiving acoustic energy through the fluids in the borehole. The acoustic energy is transmitted between transducers such that a first portion travels along the longitudinal axis of the borehole through the fluid and downstream, or in the direction of fluid flow, and a second portion travels along the longitudinal axis of the borehole and upstream, or in a direction opposite to the fluid flow. By monitoring properties of the received acoustic energy, information is obtained regrading the flow velocity and the density of the fluid in the borehole.

It has been common practice to employ acoustic energy to investigate characteristics of subterranean formations penetrated by boreholes. The acoustic energy is affected by the lithology of the subterranean formations through which it passes and the parameters of the altered acoustic energy may be logged. For example, acoustic velocity logging systems such as described in U.S. Pat. Re. No. 24,446 to G. C. Summers, "Velocity Well Logging," or U.S. Pat. No. 2,949,973 to R. A. Broding et al., "Methods of and Means for Measuring Travel Times Through Earth Formations," may be employed for effectively measuring the velocity with which acoustic pulses are propagated through the subterranean formations. On the other hand, an acoustic amplitude logging system such as described in U.S. Pat. No. 3,191,145 to G. C. Summers, "Borehole Transmission and Well Logging Systems," may be employed for measuring the amplitude of the acoustic pulses after passing through the subterranean formation; or an acoustic frequency logging system such as described in U.S. Pat. No. 2,956,635 to G. C. Summers, "Acoustic Pulse Frequency Log" or U.S. Pat. No. 2,956,634 to Joseph Zemanek, "System for Acoustic Pulse Frequency Logging," may be employed for effectively measuring the average frequency of acoustic pulses after passing through the subterranean formations. In these prior art patents, a large amount of design was expended in effecting arrangements wherein the acoustic energy would be transmitted through the subterranean formation, and not through the tool or through the fluids in the borehole.

Figure 1:
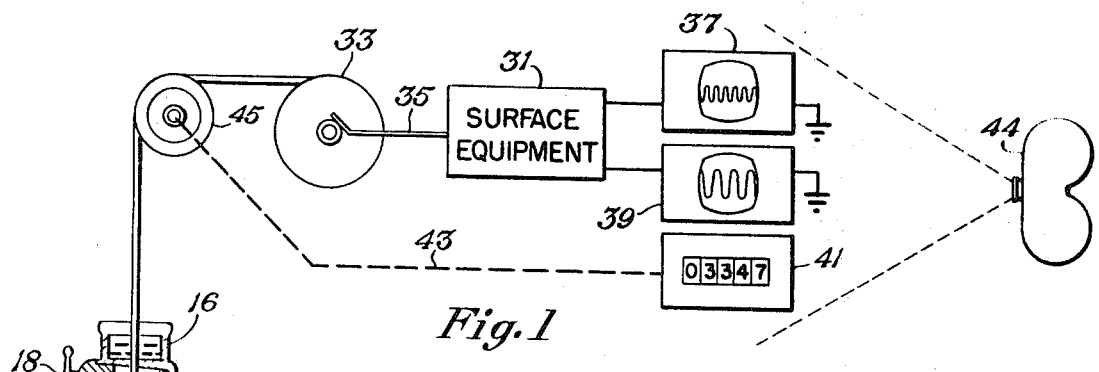
FIG. 1 is a schematic illustration, partly in section, showing a tool for monitoring fluids in a borehole in accordance with one embodiment of the invention.

Referring now to FIG. 1 there is schematically illustrated apparatus for measuring flow velocity and density of fluids in borehole 11 penetrating subterranean formations 13 thereabout. Downhole tool 14 has a plurality of transducers 15 illustrated by transmitter T and receivers R. In the borehole the plurality of transducers are arranged with transmitter T in the center and receivers R spaced respectively and equally above and below transmitter T. The transducers are respectively adapted for directionally transmitting and for receiving acoustic energy primarily through the fluids therebetween. For example, fluid passageways 17, shown in dotted lines, may be spaced at 120° around the tool to impart directional transmission to the acoustic energy such that it will travel between transmitter T and receivers R through the fluid in the borehole. To ensure that the fluid-filling fluid passageway 17 is representative in character with that in the borehole, circulation passageways 19 may be provided. The directional passageways 17 around transmitter T ensure that the fluid in these passageways represents the fluid in the well bore since they afford a continuous flow passage therefor. An attenuator 21; such as, neoprene; is provided around transmitter T to attenuate the acoustic energy emitted in directions other than along passageways 17 and prevent its traveling to receivers R via the tool or via the formation instead of fluids in the borehole.

Ordinarily, down-hole tool 14 will be inserted through a lubricator 16 atop the usual wellhead equipment including valve 18. Valve 18 will usually be a valve; such as, a plug or gate valve; having a large aperture therein to facilitate insertion of the tool. Also included in the usual wellhead equipment will be flow line 20 and valve 22, regardless of whether the well is an injection or a production well. Valve 22 may be a plug valve or any of the valves conventionally employed on wellhead equipment, commonly referred to as Christmas trees.

In order that velocity of flow data be meaningful, it is imperative that down-hole tool 14 be maintained away from the quiescent zone of fluid adjacent the wall of borehole 11 and out in the main stream of flow. Accordingly, means for preventing the tools running contiguous with the wall of the borehole are required. Such means are illustrated schematically and not to scale by centralizer bows 23. Such bows may be fastened at one point; such as, upper fixed band 25; and terminate at a lower point that is free to move with respect to the longitudinal axis of the tool, illustrated by reciprocal band 27.

A function-generating and -transmitting means is provided in connection with down-hole tool 14 for generating a function related to the acoustic energy received at the transducer serving as receiver and for transmitting the function to surface equipment. The function-generating and -transmitting means is illustrated as being down-hole. It may be at the surface. Frequently, a portion is down-hole in the tool and a portion is at the surface.

The function-generating and -transmitting means is connected via continuous conductors in cable 29 with surface equipment 31. Surface equipment 31 for discriminating the intelligence of the function transmitted thereto for the respective embodiments, and the attainment of continuous conducting means; for example, via conductors in cable 29, brushes (not shown) within cable drum 33 and conductors in line 35; are well known in the art of acoustic logging and, hence, need not be discussed in detail here.

For example, the amplitude and frequency of the acoustic energy arriving at the respective receivers may be sampled and the information sent to surface equipment 31 which discriminates the intelligence information of frequency and amplitude of the respective function and sends it to respective oscilloscopes 37 and 39 for display. The acoustic energy arriving at the downstream receiver has a higher frequency than that arriving at the upstream receiver.

Depth-measuring means is provided for convenience in analyzing the frequency and amplitude of the acoustic energy with respect to depth of the tool in the borehole. For example, depth meter 41 is responsively coupled via connection 43 with depth measuring sheave 45.

If desired, a record may be preserved for detailed study by recording the information; as with movie camera 44.

In operation, transmitter T emits acoustic energy in either time-spaced pulses or in a transmission cycle of a continuous band. Acoustic energy travels primarily along paths 46 downstream and paths 47 upstream to be received at the respective receiver transducers. The acoustic energy activates the receiving transducers which transduces the acoustic energy to electrical signals which are amplified and sent over respective continuous conductors (not shown) to surface equipment 31, as described hereinafter. The amplitude and frequency content of the signal is discriminated by the surface equipment and displayed in visual form on oscilloscopes for analysis or recording as described hereinbefore.

The tool may be moved along the longitudinal axis of the borehole while the acoustic energy is transmitted through the fluid. It may be moved upwardly or downwardly. The velocity vector of the tool is known and the resulting record can be corrected therefor. Even for gross logging the tool will not ordinarily be moved faster than 100 feet per minute and usually will be moved at about 30 feet per minute. With a repetition rate of 15 to 50 times per second and travel times between several microseconds and a few milliseconds, depending upon spacing of the transducers and nature of the fluid, the component contributed by tool movement may not be significant so correction may be neglected, though noted on the log. For fine detail in logging the fluid's velocity and characteristics as a function of depth, the tool may be traversed slowly past the formations or strata of interest or even stopped altogether at or near transition regions.

In another embodiment of the invention, (FIG. 2) the transmitter T emits, under appropriate electrical excitation time-spaced pulses of acoustic energy which travel through the fluids in the borehole and arrive at the receivers. Upon receipt of the portion of the acoustic energy traveling downstream the function-generating means generates a function representative of elapsed time between transmission and receipt of the acoustic energy. Upon receipt of the portion of acoustic energy traveling upstream, a second function-generating means generates a second function representative of elapsed time between transmission and receipt of the acoustic energy. The respective functions showing the elapsed times are sent via conductors in cable 29 and cable drum 33 to surface equipment 49. Surface equipment 49 discriminates the functions into elapsed times between the time of transmission of the pulse of acoustic energy and receipt of the downstream and upstream portions at their respective receivers. This information is sent via conductors 51 and 53 to respective first recording pin 55 and second recording pin 57 on recorder 59. Recorder 59 moves in response to connection 43 with depth-measuring sheave 45 to record the respective elapsed time signals with respect to depth of the tool in the borehole.

It may be desirable to set casing in a borehole; or, particularly, the upper portions thereof before logging flow of fluids. Moreover, it may even be desirable to set tubing. Small diameter logging tools can be employed, ordinarily without centralizer bows, in tubing in a completed well. The apparatus in accord with one embodiment of the invention can be employed to locate collars in conduit emplaced in the borehole, because collars on the conduit alter the diameter and hence the flow pattern of the fluids therethrough. This collar location capability is useful in effecting accurate measurement of depth. Specifically, the collar preceding the subterranean formation of interest can be noted and the differential depth from this point monitored to accurately depict the flow of fluids into or out of tubing, casing, or a particular stratum of the subterranean formation. By such accurate means, leaks in tubing or casing may be detected and plugged; or influx of less dense fluids; such as, hydrocarbon gases, ordinarily at the top of the formation; can be accurately delineated. Similarly, the flow of liquid hydrocarbons as well as the influx of the more dense fluids; such as, aqueous fluids like brine; can be accurately delineated. Lower casing can then be set and, with this information, accurately perforated to recover the desired liquid hydrocarbons while preventing the influx into the well through the casing of the less desirable hydrocarbon gases and the undesirable aqueous fluids. Conversely, such accurate placement of perforations is frequently advisable to obtain injection of injection fluids into the desired stratum or formation. For example, it may be that a particular type stratum contains a great deal of oil but the injection of injection fluid; such as, enriched gas; thereinto is prevented by a more permeable strata of the formation which takes most of the injected fluid. By suitably perforating in the injection well, with or without additional flow-restricting pancakes deposited in the subterranean formation, injection of injection fluid into the oil-containing strata may be vastly improved.

Figure 3:
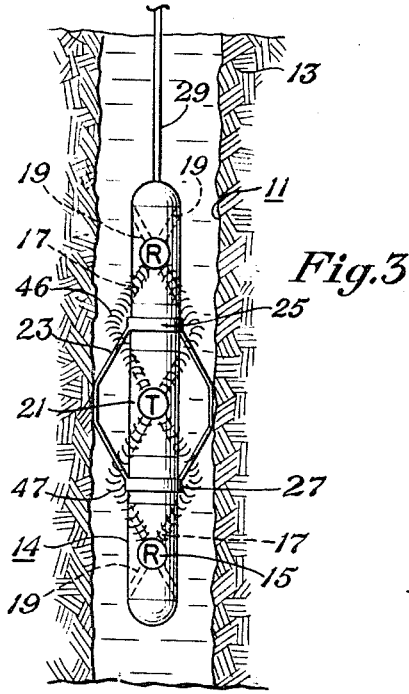
FIG. 3 shows simplified waveforms useful in and illustrating the principle underlying the embodiment in FIG. 1.

In understanding the invention, it is helpful to review some principles underlying it and some useful therewith. In discriminating intelligence bits from acoustic energy being received, either amplitude and frequency of the arriving acoustic energy can be employed or the elapsed time since the acoustic energy was transmitted can be employed. Referring to FIG. 3, acoustic energy having a frequency $f_o$ and an amplitude $a_o$ is transmitted from transmitter T. As is known after Doppler, the frequency $f_d$ arriving at the downstream receiver will be increased in proportion to the velocity of the fluid through which it is being transmitted. The frequency $f_d$ is shown as an exaggerated higher frequency to illustrate the principle. Because of the attenuation of the acoustic energy in traveling through the borehole fluids, the signal arriving at $R_d$ will have an amplitude $a_d$ less than $a_o$. The acoustic energy is converted into an electrical signal of representative frequency and amplitude. With care the signal can be transmitted so as to preserve its information content. Fidelity is improved if the electrical signal is amplified, and sampled and rectified to afford spaced pulses $p_d$ of magnitude $\Delta E_d$ to effect a function related to the received acoustic energy. The amplified signal and pulses are amenable to transmission over conventional borehole logging cable.

Conversely, the acoustic energy arriving at upstream receiver $R_u$ will have a lower apparent frequency $f_u$ and a reduced amplitude $a_u$. The amplitude $a_u$ is ordinarily about the same order of magnitude as the amplitude $a_d$ since it is primarily influenced by the density of the fluid through which the acoustic energy travels rather than the velocity. For example, less dense gas; such as, hydrocarbon gas like methane and ethane; attenuates the acoustic energy much more than liquid hydrocarbons such as crude oil. Conversely, denser aqueous fluids like brine attenuate the acoustic energy less than the liquid hydrocarbons. As described before, the acoustic energy is converted to an electrical signal which is amplified, and sampled and rectified, affording spikes $p_u$ of magnitude $\Delta E_u$. The second function of the amplified signal and spikes $p_u$ of magnitude $\Delta E_u$ can be transmitted to surface equipment 31.

Figure 2:
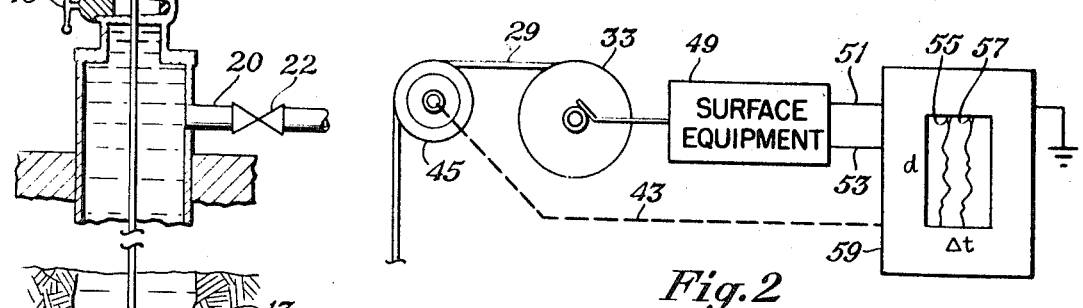
FIG. 2 is a schematic illustration of the surface portion of apparatus for monitoring fluids in a borehole in accordance with another embodiment of the invention.
Figure 4:
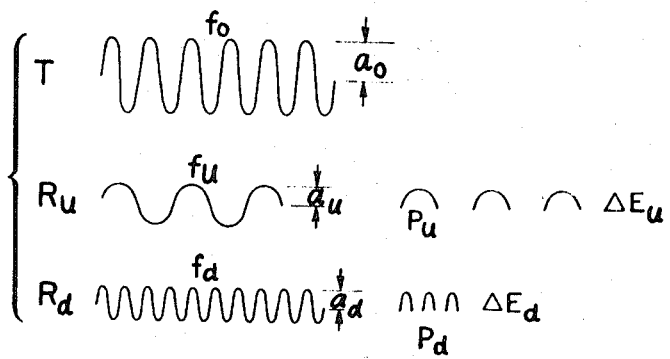
FIG. 4 illustrates a simplified time domain and a monotonically varying function affording a unique scalar quantity for each unit of time along this scale useful in and illustrating the principle underlying the embodiment of FIG. 2.
Figure 4:
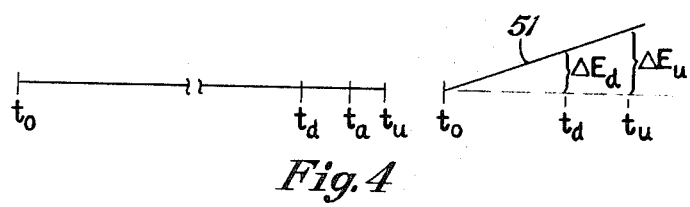

On the other hand, in the embodiment described with respect to FIG. 2, the elapsed times between transmission of the pulse of acoustic energy and its arrival at the respective downstream and upstream receiving transducers are measured and the average elapsed time determined. The scalar quantities of elapsed time are illustrated in FIG. 4 from time of transmission $t_o$ of the acoustic energy until a first arrival time $t_d$ when the acoustic energy arrives at the downstream receiver and the time $t_u$ at which it arrives at the upstream receiver. The difference in arrival times is caused by the velocity of the fluid flowing in the well bore. The velocity of the acoustic energy in the fluid is algebraically added to the velocity of the fluid flow to obtain net velocity. Thus, velocity downstream is faster and elapsed time is less. To be able to transmit a function representative of the elapsed time to surface equipment 49, a monotonically varying function generator will generate a function that increases unidirectionally with elapsed time, illustrated by the ramp function 51 of FIG. 4. For example, a voltage on ramp function 51 increases monotonically with time. Accordingly, ramp function 51 may be sampled at the time of arrival of acoustic energy at the downstream receiver to afford a potential $\Delta E_d$ whose scalar magnitude is related to the elapsed time between $t_o$ and time of arrival $t_d$. Similarly, a second sampling is made at the time of arrival of the acoustic energy at the upstream receiver to give a potential $\Delta E_u$, related to the elapsed time between $t_o$ and $t_u$. The magnitude of the scalar functions $\Delta E_d$ and $\Delta E_u$ are then transmitted via cable 29 to surface equipment 49 where it is discriminated and recorded as described hereinbefore.

By adding the elapsed time of arrival at the downstream transducer and the elapsed time of arrival at the upstream transducer and dividing by 2, an average time of transmission of the acoustic energy through the fluid is afforded. This average time represents the time it would take sound waves to be transmitted through the fluid at rest; and, thus, affords a measure of the density of the fluid in the borehole. For example, the average time of transmission through less dense gas is greater than through liquid hydrocarbons. Conversely, the average time of transmission through denser aqueous fluids is less than through the liquid hydrocarbons.

Figure 5:
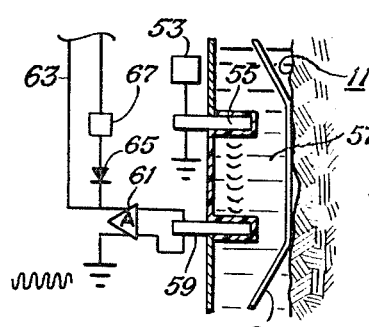
FIG. 5 is a simplified schematic illustration showing operation of a function generator useful in the embodiment of FIG. 1.
Figure 6:
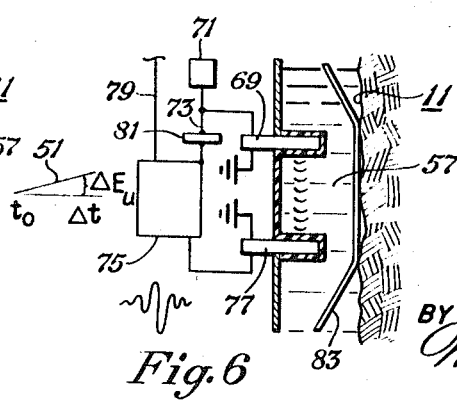
FIG. 6 is a simplified schematic illustration showing operation of a function generator useful in the embodiment of FIG. 2.

Although means for discriminating the intelligence bits from the received acoustic energy and generating functions related thereto are well known, FIGS. 5 and 6 illustrate, schematically, and briefly, the principles involved. For simplification, only two transducers are illustrated in FIGS. 5 and 6. The transducers are reversible such that first transducer serving as a transmitter on a first transmission cycle to transmit the acoustic energy upstream will serve as a receiver on the next transmission cycle when acoustic energy is transmitted downstream. For simplicity, the well-known switching circuits for reversing the transducers and transmission cycles are not illustrated.

Referring to FIG. 5 suitable firing circuit 53 pulses transducer 55 serving as transmitter for this transmission cycle for a pulsed burst of acoustic energy. A firing circuit such as described in U.S. Pat. No. 3,340,953 can be employed and allow adjusting the frequency. Any of the well-known firing circuits can be employed; for example, those described in the other patents delineated hereinbefore to afford either continuous acoustic energy or pulsed bursts of acoustic energy fired at a certain repetition rate. Even if continuous acoustic energy is employed, it is necessary to alternate the transmission cycles in apparatus of FIG. 5 in order to obtain transmission of a portion of the acoustic energy upstream and a portion of the acoustic energy downstream to be able to discriminate all of the intelligence bits desired from the received acoustic energy. Accordingly, the rate of alternating the transducers between transmitting and receiving transducers will ordinarily be several times per second. An oscillator may be employed to effect this alternation at a rate between 15 and 50 times per second; for example, 20 times per second. In any event, with respect to this transmission cycle, acoustic energy is transmitted through fluids 57 in borehole 11 to receiving transducer 59. Receiving transducer 59 transduces the acoustic energy into electrical signals of representative frequency and amplitude. The electrical signals are sent to amplifier 61. Amplifier 61 amplifies the signal a predetermined amount for transmission to surface equipment 31 via conductor 63. While frequency content can be preserved during the transmission via conductor 63 through cable 29, accurate amplitude preservation is sometimes difficult in noncoaxial cable because of attenuation and crosstalk. To help preserve a measure of amplitude, the amplified signal may be sampled via rectifier 65 and the magnitude $\Delta E_u$ determined and sent to surface equipment 31 by sampling and transmitting means 67. If desired the amplitude information can be modulated onto a carrier signal. Alternatively, the pulses of the rectified signal also may be counted and both frequency and amplitude information sent to surface equipment.

On the next transmission cycle, the interconnection of the respective transducers with the firing circuits and with amplifier 61 are reversed by well-known switching means, as indicated hereinbefore.

Referring to FIG. 6, transmitting transducer 69 is suitably pulsed by firing circuit 71 to transmit a pulsed burst of short duration through fluids 57 in borehole 11. The burst should approach a single spike as near as possible. Any of the well-known firing circuits may be employed as firing circuit 71. For variable frequency, a firing circuit described by previously mentioned U.S. Pat. No. 3,340,953 can be employed. At the same time firing circuit 71 excites transmitting transducer 61, it signals via conductor 73 starting time $t_o$ to monotonically varying function generator in function-generating and -transmitting means 75. The function, illustrated by ramp function 51, continues to vary unidirectionally until it is sampled upon receipt of acoustic energy at receiving transducer 77. Thereafter, the monotonically varying function generator is stopped, and the function-retaining means discharged. Accordingly, upon receipt of the acoustic energy at receiving transducer 77, the function is sampled and transmitted to surface equipment 49 via conductor 79. The relative magnitude of the function, illustrated as $\Delta E_u$, is then recorded by recorder 59. The next transmission cycle is initiated.

Before and during the next transmission cycle, the respective transducers are switched by a well-known switching means such that transducer 77 is connected with firing circuit 71 and transducer 69 is connected with function-generating and -transmitting means 75.

Appropriate blocking filters 81 can be employed to prevent feedback from the transmitting transducer inadvertently causing the sampling of the function because of reflected acoustic energy from the wall of the borehole or other impediments of different density from the fluid in the borehole.

Any arrangement of transducers can be employed to effect logging of the fluids in the borehole. FIG. 1 illustrates an arrangement in which the transmitter is in the center with receiving transducers above and below it. Also, shown in FIGS. 5 and 6, is an arrangement employing only two transducers with the transmitter and receiver being alternated respectively during the transmission cycles. Another arrangement that affords a check on the information logged with regard to the acoustic energy being transmitted upstream or downstream is to employ terminal transducers in a grouping as transmitting transducers and to employ a plurality of receiving transducers on the same side of the transmitting transducer. In one embodiment, the terminal transducers are employed to alternately transmit and receive acoustic energy, and the receiving transducers are all on the same side of the transmitting transducer. As indicated, at least the two terminal transducers in such an arrangement are operable in both the receiving and transmitting mode and are alternately and respectively employed in the receiving mode and in the transmitting mode. If desired, three or more receiving transducers can be employed on the same side of the transmitting transducer such that a logged parameter from two of the receiving transducers would afford a cross-check and ensure accuracy. Almost any spacing of transducers can be employed.

A wide variety of frequencies will afford suitable acoustic energy. For example, a frequency may be employed in the range from 10,000 c.p.s. up to the range as high as 2,000,000 c.p.s.

To obtain the best logging information inherent in using particular acoustic frequencies, the transducers should be designed to resonate at the given frequency. Conventional acoustic logging systems employ a frequency of about 20,000 c.p.s., referred to as 20 kc. Ordinarily, the transducers are preferably piezoelectric crystals; such as, ceramic crystals of barium titanate or barium titanate modified to operate at elevated temperature. Such modified crystals are illustrated by Clevite's PZT. To obtain the resonate frequency in the desired range, the thickness of the crystal may be obtained from commercial suppliers. Conventional logging transducers are well known and readily available. Sometimes higher frequencies are desirable and require thinner crystals. For example, to obtain a resonant frequency of 300 kc., the Clevite Corporation Bulletin No. 9247 indicates their barium titanate crystals should have a thickness of about 0.26 inch.

If desired, the electrical signals generated by the receiving transducer upon the arrival of the acoustic energy of the desired frequency may be amplified and transmitted directly to the surface equipment, as indicated. The fidelity of such direct amplification and transmission necessitates employing coaxial logging cable having good high frequency transmitting characteristics; for example, similar to those of cable having standard specification RG 58 A/U. Specifically, number 20AWG Cable, having such characteristics, is available from Vector Cable Company, Houston, Texas. On the other hand, the envelope of the electrical signals generated by the arrival of the acoustic energy may be amplified and transmitted to the surface equipment when the logging cable conductor is not a coaxial logging cable. Measuring of the envelope of the electrical signal is simply a demodulation process such as described in Radio Engineer's Hand Book, F. E. Terman, First Edition 8th Impression, McGraw-Hill Book Company, Inc., New York and London, 1943, pages 553, etc. Suitable for converting the envelope of the electrical signal is the diode rectifier detector illustrated in FIG. 25a and described at pages 553 and 554 therein. Specifically, such a diode rectifier detector takes a signal input and converts it to an envelope having a lower frequency. The envelope of the electrical signal is thus of a lower frequency than the relatively high frequency acoustic energy which is employed in such special embodiments, and the resulting envelope signal may be employed directly in conventional acoustic velocity or acoustic amplitude logging equipment.

Proper mounting of transducers to effect good acoustic coupling with the fluid in the borehole, yet protect the transducer, is well known. Ordinarily, each of the transducers and their respective electrical conductors are enclosed within a sealed, thin, insulating covering. If the transducers project into the fluid as illustrated schematically in FIGS. 5 and 6, they should be protected against breaking; as by centralizer bows 83. Such bows may be plastic instead of metal to prevent any interference with the acoustic energy transmission through the fluid.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. In a method of monitoring fluids and flow in a borehole penetrating subterranean formations including the steps of emplacing a plurality of acoustic transducers that are spaced apart longitudinally of said borehole and in a down-hole tool at at least one location in said borehole, transmitting and receiving acoustic energy between said spaced-apart acoustic transducers, generating functions that are related to the transmitted and received acoustic energy, transmitting the functions to equipment at the surface for meaningful observation and for preserving a record if desired, the improvement comprising:

a. transmitting acoustic energy of a predetermined frequency through said fluids in said borehole between said transducers, said acoustic energy having a first portion traveling along the longitudinal axis of said borehole and downstream, and a second portion traveling along the longitudinal axis of said borehole and upstream;
   b. discriminating said first and second portions of acoustic energy arriving through the fluid column in said borehole; and detecting from said first and second portions of acoustic energy arriving at the respective transducer operating as a receiver apparent frequency affording information as to frequency shift which is related to fluid flow velocity, and amplitude which is related to fluid density.

2. The method of claim 1 wherein continuous acoustic energy is employed.

3. The method of claim 1 wherein said plurality of acoustic transducers are traversed along a longitudinal axis of said borehole.

4. The method of claim 3 wherein continuous acoustic energy is employed.

5. Apparatus for measuring flow velocity and density of fluids in a borehole penetrating subterranean formations comprising:

a. down-hole tool having a plurality of transducers adapted for directionally transmitting and receiving acoustic energy primarily through said fluids therebetween, and for transmitting a first portion of said acoustic energy downstream and a second portion of said acoustic energy upstream;
   b. directional means disposed adjacent said transducers for effecting the passage of said acoustic energy along the shortest path and through the column of said fluids in said borehole therebetween;
   c. attenuation means also disposed adjacent said transducer for attenuating acoustic energy passing outwardly into said formation; said attenuation means and said directional means cooperating to discriminate the acoustic energy passing through said column of fluid from that passing through said formation;
   d. function-generating and -transmitting means for generating a function related to the acoustic energy received at the respective transducer serving as receiver and for transmitting said function to surface equipment;
   e. surface equipment for discriminating intelligence information from said function;
   f. supporting and conducting means connecting said down-hole tool with said surface equipment;
   g. depth-measuring means in association with said supporting and conducting means for determining the depth of said down-hole tool; and
   h. means for correlating said intelligence information with respect to said depth.

6. The apparatus of claim 5 wherein said down-hole tool has a transmitting transducer and at least two receiver transducers, and a function-generating means connected with each of said receiver transducers.

7. The apparatus of claim 6 wherein said at least two receiver transducers are equally spaced above and below said transmitting transducer when said tool is in said borehole.

8. The apparatus of claim 6 wherein said at least two receiver transducers are both on the same side of said transmitting transducer.

9. The apparatus of claim 8 wherein the two end transducers are operable in both the transmitting and receiving modes.

10. The apparatus of claim 5 wherein said down-hole tool has at least two transducers that are operable in both the receiving and transmitting mode and includes switch means for alternately and respectively operating said transducers in the receiving mode and in the transmitting mode.

11. The apparatus of claim 5 wherein said function-generating and -transmitting means generates a function representative of elapsed time between transmission of said acoustic energy by a transmitting transducer and receipt of said acoustic energy by a receiving transducer.

12. The apparatus of claim 11 wherein said function-generating and -transmitting means employs a monotonically varying function generator starting at the time of transmission of said acoustic energy and increasing the absolute value of said function until arrival of said acoustic energy at which time said function is sampled and its magnitude transmitted to said surface equipment.

13. The apparatus of claim 5 wherein said function-generating and -transmitting means converts said acoustic energy to electrical signal having representative frequency and amplitude and said signal is amplified and transmitted to said surface equipment.

14. The apparatus of claim 5 wherein said function-generating and -transmitting means converts said acoustic energy to electrical signal having representative frequency and amplitude and said electrical signal is sampled via a rectifier and information representing the magnitude of the rectified signal is transmitted to said surface equipment.

15. In a method of monitoring fluids and flow in a borehole penetrating subterranean formations including the steps of emplacing a plurality of acoustic transducers that are spaced apart longitudinally of said borehole and in a down-hole tool at at least one location in said borehole, transmitting and receiving acoustic energy between said acoustic transducers, generating functions that are related to the transmitted and received acoustic energy, transmitting the functions to equipment at the surface for meaningful observations and for preserving a record if desired, the improvement comprising:
  a. transmitting acoustic energy of a predetermined frequency through said fluids in said borehole between said transducers, said acoustic energy having a first portion traveling along the longitudinal axis of said borehole and downstream, and a second portion traveling along the longitudinal axis of said borehole and upstream;
  b. discriminating said first and second portions of acoustic energy arriving through the fluid column in said borehole; and
  c. determining from said first and second portions of acoustic energy arriving at the respective transducer operating as a receiver the travel time downstream and the travel time upstream; the difference in the respective travel times upstream and downstream which is related to the fluid flow velocity; and the average travel time of the respective travel times upstream and downstream which is related to fluid density.

16. The method of claim 15 wherein the travel time downstream and the travel time upstream, the difference in the respective travel times and the average travel time of the respective travel times are recorded in appropriate form with respect to depth.